United States Patent
Huang-Fu

(10) Patent No.: US 11,337,267 B2
(45) Date of Patent: May 17, 2022

(54) APPARATUSES AND METHODS FOR 5G SESSION MANAGEMENT (5GSM) PROCEDURE ENHANCEMENT

(71) Applicant: MEDIATEK INC., Hsinchu (TW)

(72) Inventor: Chien-Chun Huang-Fu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/985,339

(22) Filed: Aug. 5, 2020

(65) Prior Publication Data
US 2021/0100060 A1  Apr. 1, 2021

Related U.S. Application Data

(60) Provisional application No. 62/907,925, filed on Sep. 30, 2019.

(51) Int. Cl.
| | |
|---|---|
| H04W 36/00 | (2009.01) |
| H04W 76/16 | (2018.01) |
| H04W 76/25 | (2018.01) |
| H04W 76/22 | (2018.01) |
| H04W 76/10 | (2018.01) |
| H04W 28/08 | (2009.01) |
| H04W 28/02 | (2009.01) |
| H04W 28/04 | (2009.01) |

(52) U.S. Cl.
CPC ....... *H04W 76/25* (2018.02); *H04W 28/0263* (2013.01); *H04W 28/04* (2013.01); *H04W 28/0967* (2020.05); *H04W 76/10* (2018.02); *H04W 76/22* (2018.02)

(58) Field of Classification Search
CPC ............ H04W 28/0263; H04W 28/04; H04W 28/0967; H04W 76/10; H04W 76/22; H04W 76/25; H04W 36/0022; H04W 76/16; H04W 36/0033
See application file for complete search history.

(56) References Cited

U.S. PATENT DOCUMENTS

| | | | | |
|---|---|---|---|---|
| 2014/0016614 | A1* | 1/2014 | Velev | H04W 76/38 370/331 |
| 2016/0212792 | A1* | 7/2016 | Chang | H04W 76/22 |
| 2017/0257905 | A1* | 9/2017 | Choi | H04W 36/08 |

(Continued)

OTHER PUBLICATIONS

European Search Report dated Feb. 26, 2021, issued in application No. EP 20194252.1.

(Continued)

*Primary Examiner* — Nathan S Taylor
(74) *Attorney, Agent, or Firm* — McClure, Qualey & Rodack, LLP

(57) ABSTRACT

A method, executed by a User Equipment (UE) communicatively connected to a mobile communication network, is provided. The method may include the following steps: receiving a first 5G Session Management (5GSM) message including one mapped Evolved Packet System (EPS) bearer context for an inter-system change from the mobile communication network; determining whether the mapped EPS bearer context has invalid or missing parameters; and sending a second 5GSM message to the mobile communication network to delete the mapped EPS bearer context in response to the mapped EPS bearer context has one or more invalid or missing parameters.

18 Claims, 5 Drawing Sheets

(56) References Cited

U.S. PATENT DOCUMENTS

| | | | |
|---|---|---|---|
| 2018/0234891 A1* | 8/2018 | Jin | H04W 28/0263 |
| 2019/0159157 A1* | 5/2019 | Gupta | H04W 60/005 |
| 2020/0267780 A1* | 8/2020 | Huang-Fu | H04W 76/10 |
| 2020/0275305 A1* | 8/2020 | Huang-Fu | H04W 80/10 |
| 2020/0322834 A1* | 10/2020 | Huang-Fu | H04W 76/22 |
| 2021/0105847 A1* | 4/2021 | Prabhakar | H04W 36/14 |
| 2021/0195490 A1* | 6/2021 | Rommer | H04W 36/14 |
| 2021/0297904 A1* | 9/2021 | Watfa | H04W 28/24 |
| 2021/0321287 A1* | 10/2021 | Chaponniere | H04W 28/12 |

OTHER PUBLICATIONS

"MA PDU Session Modification for ATSSS Parameters;" 3GPP TSG-CT WG1 Meeting #119 C1-194196; Aug. 2019; pp. 1-12.
"3rd Generation Partnership Project; Technical Specification Group Core Network and Terminals; Non-Access-Stratum (NAS) Protocol for Evolved Packet System (EPS); Stage 3 (Release 16);" 3GPP TS 24.301 V16.2.0; Sep. 2019; pp. 1-558.
"Mapped EPS Bearer Context Without TFT;" 3GPP TSG-CT WG1 Meeting #119 C1-194533; Aug. 2019; pp. 1-14.
"QoS Flow and Mapped EPS Bearer Context;" 3GPP TSG-CT WG1 Meeting #113 C1-188439; Nov. 2018; pp. 1-12.

* cited by examiner

APPARATUSES AND METHODS FOR 5G SESSION MANAGEMENT (5GSM) PROCEDURE ENHANCEMENT

CROSS REFERENCE TO RELATED APPLICATIONS

This Application claims priority of U.S. Provisional Application No. 62/907,925, filed on Sep. 30, 2019, the entirety of which is incorporated by reference herein.

BACKGROUND OF THE APPLICATION

Field of the Application

The application generally relates to mobile communications and, more particularly, to apparatuses and methods for 5G Session Management (5GSM) procedure enhancement.

Description of the Related Art

In a typical mobile communication environment, a User Equipment (UE) (also called a Mobile Station (MS)), such as a mobile telephone (also known as a cellular or cell phone), or a tablet Personal Computer (PC) with wireless communications capability, may communicate voice and/or data signals to one or more mobile communication networks. The wireless communications between the UE and the mobile communication networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc. In particular, GSM/GPRS/EDGE technology is also called 2G cellular technology; WCDMA/CDMA-2000/TD-SCDMA technology is also called 3G cellular technology; and LTE/LTE-A/TD-LTE technology is also called 4G cellular technology.

These RATs have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In 5G, a Protocol Data Unit (PDU) session defines the association between a UE and the data network that provides a PDU connectivity service. Each PDU session is identified by a PDU session ID, and may include multiple QoS flows and QoS rules. A QoS flow is the finest granularity for QoS management to enable more flexible QoS control. The concept of QoS flow in 5G is like Evolved Packet System (EPS) bearer in 4G According to the 3GPP specifications in compliance with 5G NR, interworking between 5G System (5GS) and EPS may be supported, and a UE is allowed to perform an inter-system change procedure to switch from a 5GS to an EPS, or from an EPS to a 5GS. Before the inter-system change from a 5GS to an EPS, the parameters of PDU sessions should be properly mapped to the parameters of EPS bearers, and the mapped EPS bearer contexts should be provided to the UE through 5G Session Management (5GSM) procedures.

However, in some cases, semantic errors may occur in the mapped EPS bearer contexts. As a result, the UE may not be able to establish the corresponding EPS bearer contexts successfully after the inter-system change, which can lead to failure of service continuity.

BRIEF SUMMARY OF THE APPLICATION

In order to solve the aforementioned problem, the present application proposes to enable the UE to examine the mapped EPS bearer contexts to see if there's any semantic error in each mapped EPS bearer context. In particular, the semantic error of the resulting mapped EPS bearer context having invalid or missing parameters should be spotted for proper handling.

In a first aspect of the application, a method, executed by a UE communicatively connected to a mobile communication network, is provided. The method comprises the following steps: receiving a first 5GSM message comprising at least one mapped EPS bearer context for an inter-system change from the mobile communication network; determining whether the mapped EPS bearer context has one or more invalid or missing parameters; and sending a second 5GSM message to the mobile communication network to delete the mapped EPS bearer context in response to the mapped EPS bearer context has one or more invalid or missing parameters.

In a further embodiment of the first aspect, the first 5GSM message is a PDU SESSION MODIFICATION COMMAND message or a PDU SESSION ESTABLISHMENT ACCEPT message.

In a further embodiment of the first aspect, the first 5GSM message is received when the UE is in an N1 mode, and the inter-system change is from the N1 mode to an S1 mode.

In a further embodiment of the first aspect, the mapped EPS bearer context comprises an operation code indicating to create a new EPS bearer or modify an existing EPS bearer.

In a further embodiment of the first aspect, the invalid or missing parameters are mandatory parameters for activation of a dedicated EPS bearer context for the inter-system change.

In a further embodiment of the first aspect, the mandatory parameters comprise EPS Quality of Service (QoS) parameters and Traffic Flow Template (TFT) parameters for the dedicated EPS bearer context.

In a further embodiment of the first aspect, the invalid or missing parameters are mandatory parameters for activation of a default EPS bearer context for the inter-system change.

In a further embodiment of the first aspect, the mandatory parameters comprise EPS QoS parameters for the default EPS bearer context.

In a further embodiment of the first aspect, each of the invalid parameters is a mandatory parameter having a reserved value, a decoding error, a length error, a syntactical error, or a semantic error, or being empty.

In a further embodiment of the first aspect, the second 5GSM message is a PDU SESSION MODIFICATION REQUEST message comprising a 5GSM cause indicating invalid mapped EPS bearer identity.

In a second aspect of the application, a UE comprising a wireless transceiver and controller is provided. The wireless transceiver is configured to perform wireless transmission and reception to and from a mobile communication network. The controller is coupled to the wireless transceiver, and is configured to receive a first 5GSM message comprising at least one mapped EPS bearer context for an inter-system change from the mobile communication network via the wireless transceiver, and determine whether the mapped EPS bearer context has one or more invalid or missing parameters. The controller further sends a second 5GSM message to the mobile communication network via the wireless transceiver to delete the mapped EPS bearer context in response to the mapped EPS bearer context has one or more invalid or missing parameters.

In a further embodiment of the second aspect, the first 5GSM message is a PDU SESSION MODIFICATION COMMAND message or a PDU SESSION ESTABLISHMENT ACCEPT message.

In a further embodiment of the second aspect, the first 5GSM message is received when the UE is in an N1 mode, and the inter-system change is from the N1 mode to an S1 mode.

In a further embodiment of the second aspect, the mapped EPS bearer context comprises an operation code indicating to create a new EPS bearer or modify an existing EPS bearer.

In a further embodiment of the second aspect, the invalid or missing parameters are mandatory parameters for activation of a dedicated EPS bearer context for the inter-system change.

In a further embodiment of the second aspect, the mandatory parameters comprise EPS QoS parameters and TFT parameters for the dedicated EPS bearer context.

In a further embodiment of the second aspect, the invalid or missing parameters are mandatory parameters for activation of a default EPS bearer context for the inter-system change.

In a further embodiment of the second aspect, the mandatory parameters comprise EPS QoS parameters for the default EPS bearer context.

In a further embodiment of the second aspect, each of the invalid parameters is a mandatory parameter having a reserved value, a decoding error, a length error, a syntactical error, or a semantic error, or being empty.

In a further embodiment of the second aspect, the second 5GSM message is a PDU SESSION MODIFICATION REQUEST message comprising a 5GSM cause indicating invalid mapped EPS bearer identity.

Other aspects and features of the present application will become apparent to those with ordinarily skill in the art upon review of the following descriptions of specific embodiments of the methods and UEs for 5GSM procedure enhancement.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
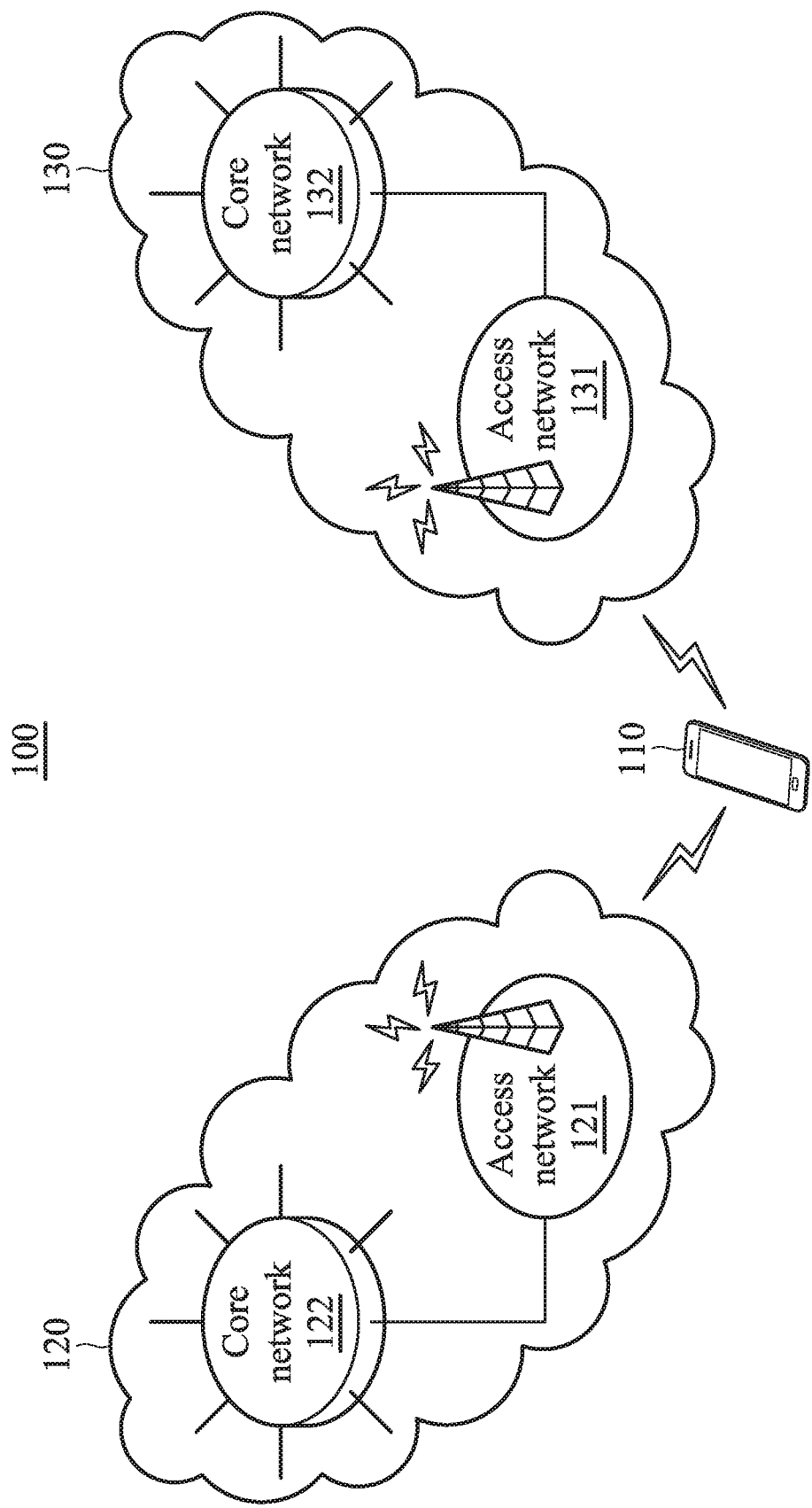
FIG. 1 is a block diagram of a mobile communication environment according to an embodiment of the application.

FIG. 1 is a block diagram of a mobile communication environment according to an embodiment of the application.

As shown in FIG. 1, the mobile communication environment 100 may include a User Equipment (UE) 110 and two mobile communication networks 120 and 130, wherein the UE 110 may be selectively connected to one or both of the mobile communication networks 120 and 130 for obtaining mobile services.

The UE 110 may be a feature phone, a smartphone, a panel Personal Computer (PC), a laptop computer, or any wireless communication device supporting the RATs utilized by the mobile communication networks 120 and 130.

The mobile communication network 120 may include an access network 121 and a core network 122, while the mobile communication network 130 may include an access network 131 and a core network 132. The access networks 121 and 131 are responsible for processing radio signals, terminating radio protocols, and connecting the UE 110 with the core networks 122 and 132, respectively. The core networks 122 and 132 are responsible for performing mobility management, network-side authentication, and interfaces with public/external networks (e.g., the Internet). The access networks 121 and 131, and the core networks 122 and 132 may each comprise one or more network nodes for carrying out said functions.

For example, the mobile communication network 120 may be a 5G NR network, and the access network 121 and the core network 122 may be a Next Generation Radio Access Network (NG-RAN) and a Next Generation Core Network (NG-CN), respectively.

An NG-RAN may include one or more cellular stations, such as next generation NodeBs (gNBs), which support high frequency bands (e.g., above 24 GHz), and each gNB may further include one or more Transmission Reception Points (TRPs). Some gNB functions may be distributed across different TRPs, while others may be centralized, leaving the flexibility and scope of specific deployments to fulfill the requirements for specific cases.

A NG-CN generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

For example, the mobile communication network 130 may be a 4G LTE network, and the access network 131 and the core network 132 may be an Evolved-Universal Terrestrial Radio Access Network (E-UTRAN) and an Evolved Packet Core (EPC), respectively.

The E-UTRAN may include at least an evolved NodeB (eNB) (e.g., a macro eNB, femto eNB, or pico eNB). The EPC may include a Home Subscriber Server (HSS), Mobility Management Entity (MME), Serving Gateway (S-GW), and Packet Data Network Gateway (PDN-GW or P-GW).

The HSS is a central database that contains user-related and subscription-related information. The functions of the HSS include functionalities such as mobility management, call and session establishment support, user authentication and access authorization.

The MME is responsible for idle mode UE paging and tagging procedures including retransmissions. It is involved in the bearer activation/deactivation process and is also responsible for choosing the S-GW for the UE 110 at the initial attach and at time of intra-LTE handover involving Core Network (CN) node relocation. It is also responsible for user authentication (by interacting with the HSS) and generation/allocation of temporary identities to the UE 110. It is also the termination point in the network for ciphering/integrity protection for Non Access Stratum (NAS) signaling and handles the security key management.

The S-GW is responsible for routing and forwarding user data packets, while also acting as the mobility anchor for the user plane during inter-eNB handovers and as the anchor for mobility between LTE and other 3GPP technologies.

The P-GW provides connectivity from the UE 110 to external PDNs by being the point of exit and entry of traffic for the UE 110. The PGW also provides the functions of policy enforcement, packet filtering for each user, charging support, lawful interception, and packet screening.

It should be understood that the mobile communication environment 100 described in the embodiment of FIG. 1 are for illustrative purposes only and are not intended to limit the scope of the application.

Figure 2:
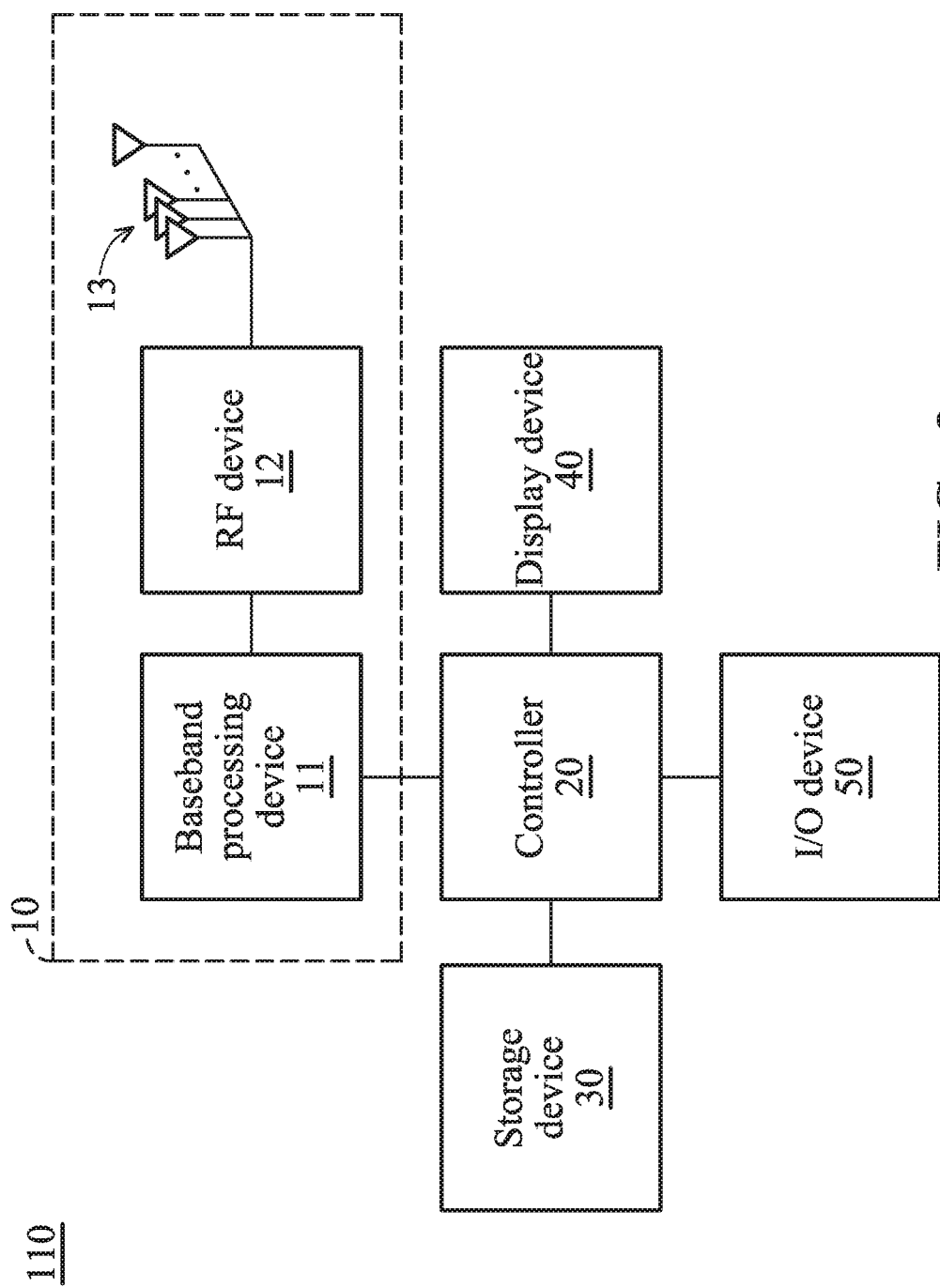
FIG. 2 is a block diagram illustrating the UE 110 according to an embodiment of the application.

FIG. 2 is a block diagram illustrating the UE 110 according to an embodiment of the application.

As shown in FIG. 2, the UE 110 may include a wireless transceiver 10, a controller 20, a storage device 30, a display device 40, and an Input/Output (I/O) device 50.

The wireless transceiver 10 is configured to perform wireless transmission and reception to and from the mobile communication network 120 and/or the mobile communication network 130.

Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing and control the communications between subscriber identity card(s) (not shown) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may comprise a mixer to multiply the baseband signals with a carrier oscillated in the radio frequency of the supported RAT(s), wherein the radio frequency may be any radio frequency (e.g., 30 GHz~300 GHz for mmWave) utilized in the 5G NR technology, or may be 900 MHz, 2100 MHz, or 2.6 GHz utilized in 4G LTE-LTE-A/TD-LTE technology, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communication with the mobile communication network 120 and/or the mobile communication network 130, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method of the present application.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method of the present application.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application.

For example, a UE may include more components, such as a power supply, a Global Positioning System (GPS) device, and/or another wireless transceiver. The power supply may be a mobile/replaceable battery providing power to all the other components of the UE 110. The GPS device may provide the location information of the UE 110 for use by some location-based services or applications. In case the UE 110 supports dual registration with 5GS and EPS, the other wireless transceiver may be used for wireless transmission and reception to and from one of the mobile communication networks 120 and 130, while the wireless transceiver 10 may be used for wireless transmission and reception to and from the other of the mobile communication networks 120 and 130. Alternatively, a UE may include fewer components. For example, the UE may not include the display device 40 and/or the I/O device 50.

Figure 3:
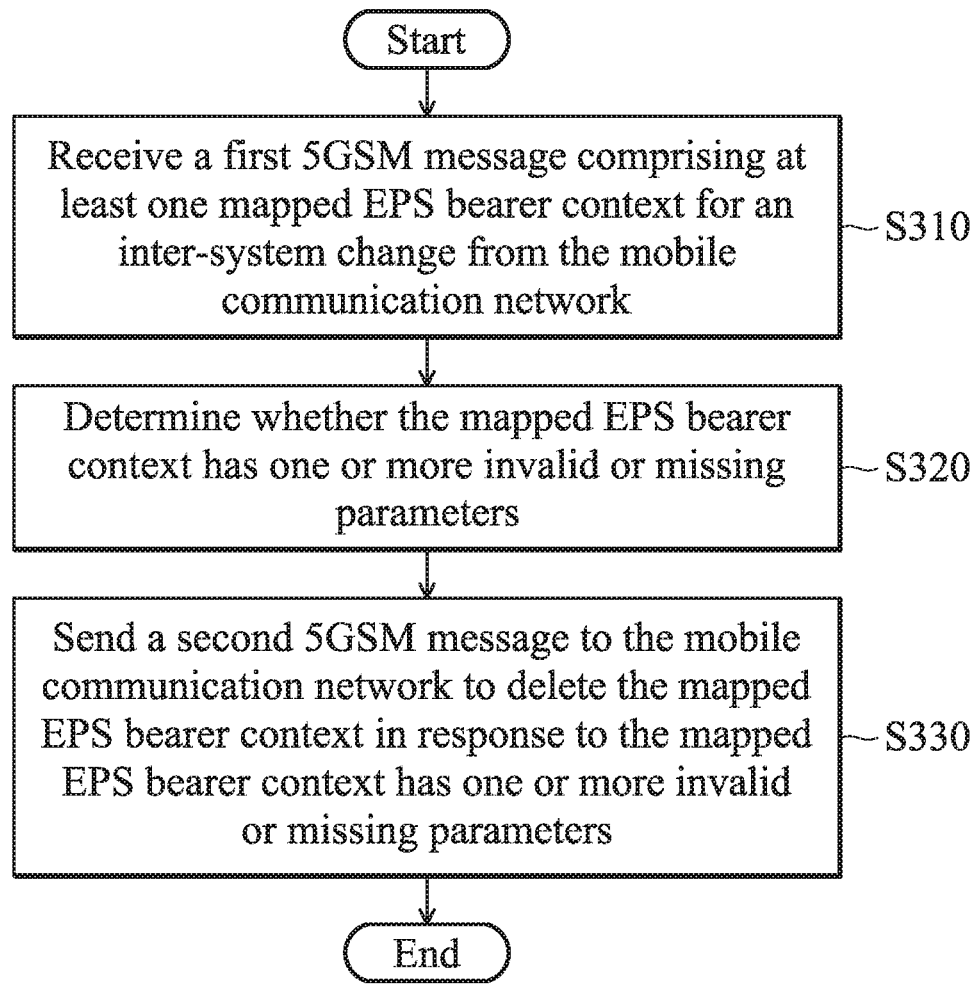
FIG. 3 is a flow chart illustrating the method for 5GSM procedure enhancement according to an embodiment of the application.

FIG. 3 is a flow chart illustrating the method for 5GSM procedure enhancement according to an embodiment of the application.

In this embodiment, the method for 5GSM procedure enhancement may be applied to and executed by a UE (e.g., the UE 110) wirelessly and communicatively connected to a mobile communication network (e.g., the mobile communication network 120).

To begin with, the UE receives a first 5GSM message including at least one mapped EPS bearer context for an inter-system change from the mobile communication network (step S310).

Specifically, the first 5GSM message is received when the UE is in an N1 mode, and the inter-system change is from the N1 mode to an S1 mode. The N1 mode refers to a mode of the UE allowing access to the 5G core network via the 5G access network, while the S1 mode refers to a mode of the UE allowing access to the 4G core network via the 4G access network.

In one embodiment, the first 5GSM message may be received during a network-requested PDU session modification procedure, and the first 5GSM message may be a PDU SESSION MODIFICATION COMMAND message.

In another embodiment, the first 5GSM message may be received during a UE-requested PDU session establishment procedure, and the first 5GSM message may be a PDU SESSION ESTABLISHMENT ACCEPT message.

Subsequent to step S310, the UE determines whether the mapped EPS bearer context has one or more invalid or missing parameters (step S320).

Specifically, the mapped EPS bearer context includes an operation code indicating "Create new EPS bearer" or "Modify existing EPS bearer".

In one embodiment, the invalid or missing parameters may be mandatory parameters for activation of a dedicated EPS bearer context for the inter-system change. For example, the mandatory parameters may include EPS Quality of Service (QoS) parameters and Traffic Flow Template (TFT) parameters for the dedicated EPS bearer context.

In another embodiment, the invalid or missing parameters may be mandatory parameters for activation of a default EPS bearer context for the inter-system change. For example, the mandatory parameters may include EPS QoS parameters for the default EPS bearer context.

If any one of the EPS QoS parameters and the TFT parameters has a reserved value, a decoding error, a length error, a syntactical error, or a semantic error, or is empty, it may be determined that the mapped EPS bearer context has invalid parameter(s). Reference may be made to the 3GPP specifications in compliance with 5G NR for definitions of a reserved value, a decoding error, a length error, a syntactical error, or a semantic error of the aforementioned parameters.

Subsequent to step S320, the UE sends a second 5GSM message to the mobile communication network to delete the mapped EPS bearer context in response to the mapped EPS bearer context has one or more invalid or missing parameters (step S330), and the method ends.

Specifically, the second 5GSM message is a PDU SESSION MODIFICATION REQUEST message including a 5GSM cause (e.g., 5GSM cause #85) indicating "Invalid mapped EPS bearer identity".

Figure 4:
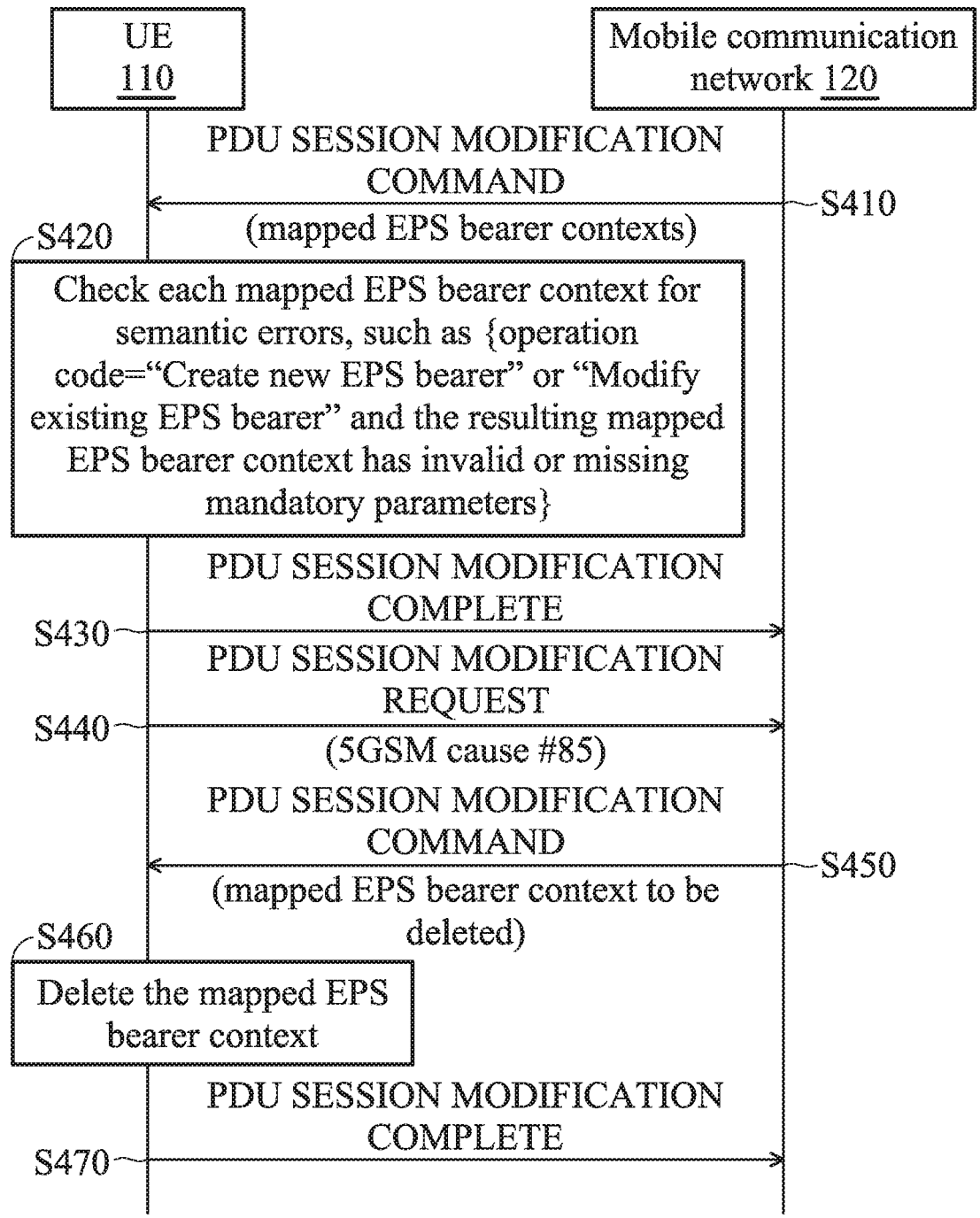
FIG. 4 is a message sequence chart illustrating the enhancement of a network-requested PDU session modification procedure according to an embodiment of the application.

FIG. 4 is a message sequence chart illustrating the enhancement of a network-requested PDU session modification procedure according to an embodiment of the application.

In step S410, the UE 110 receives a PDU SESSION MODIFICATION COMMAND message including mapped EPS bearer contexts from the mobile communication network 120 (e.g., a 5GS).

In step S420, the UE 110 checks each mapped EPS bearer context for semantic errors. Specifically, one particular semantic error is found in one of the mapped EPS bearer contexts, wherein the particular semantic error refers to that the operation code indicates "Create new EPS bearer" or "Modify existing EPS bearer" and the resulting mapped EPS bearer context has invalid or missing mandatory parameters (e.g., mapped EPS QoS parameters or TFT for a dedicated EPS bearer context).

In step S430, the UE 110 sends a PDU SESSION MODIFICATION COMPLETE message to the mobile communication network 120.

In step S440, when the particular semantic error is found in a mapped EPS bearer context, the UE 110 initiates a PDU session modification procedure by sending a PDU SESSION MODIFICATION REQUEST message to delete the mapped EPS bearer context with 5GSM cause #85 "Invalid mapped EPS bearer identity".

In step S450, the UE 110 receives a PDU SESSION MODIFICATION COMMAND message from the mobile communication network 120. Specifically, the PDU SESSION MODIFICATION COMMAND message includes the mapped EPS bearer context to be deleted.

In step S460, the UE 110 deletes the mapped EPS bearer context according to the PDU SESSION MODIFICATION COMMAND message.

In step S470, the UE 110 sends a PDU SESSION MODIFICATION COMPLETE message to the mobile communication network 120.

Figure 5:
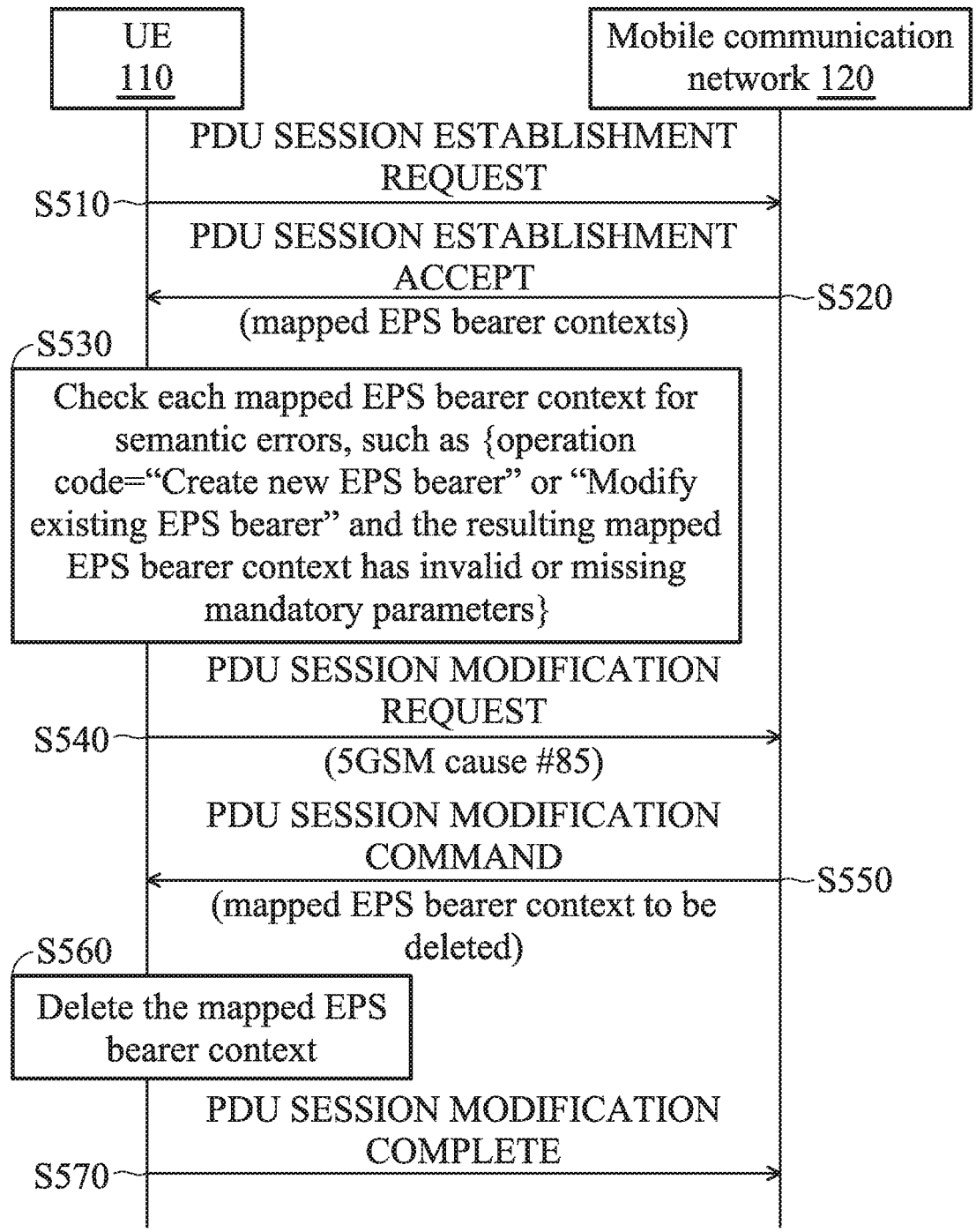
FIG. 5 is a message sequence chart illustrating the enhancement of a UE-requested PDU session establishment procedure according to an embodiment of the application.

FIG. 5 is a message sequence chart illustrating the enhancement of a UE-requested PDU session establishment procedure according to an embodiment of the application.

In step S510, the UE 110 sends a PDU SESSION ESTABLISHMENT REQUEST message to the mobile communication network 120 (e.g., a 5GS).

In step S520, the UE 110 receives a PDU SESSION ESTABLISHMENT ACCEPT message including mapped EPS bearer contexts from the mobile communication network 120

In step S530, the UE 110 checks each mapped EPS bearer context for semantic errors. Specifically, one particular semantic error is found in one of the mapped EPS bearer contexts, wherein the particular semantic error refers to that the operation code indicates "Create new EPS bearer" or "Modify existing EPS bearer" and the resulting mapped EPS bearer context has invalid or missing mandatory parameters (e.g., mapped EPS QoS parameters or TFT for a dedicated EPS bearer context).

In step S540, when the particular semantic error is found in a mapped EPS bearer context, the UE 110 initiates a PDU session modification procedure by sending a PDU SESSION MODIFICATION REQUEST message to delete the mapped EPS bearer context with 5GSM cause #85 "Invalid mapped EPS bearer identity".

In step S550, the UE 110 receives a PDU SESSION MODIFICATION COMMAND message from the mobile communication network 120. Specifically, the PDU SESSION MODIFICATION COMMAND message includes the mapped EPS bearer context to be deleted.

In step S560, the UE 110 deletes the mapped EPS bearer context according to the PDU SESSION MODIFICATION COMMAND message.

In step S570, the UE 110 sends a PDU SESSION MODIFICATION COMPLETE message to the mobile communication network 120.

In view of the forgoing embodiments, it will be appreciated that the present application enhances 5GSM procedures (e.g., network-requested PDU session modification procedure and UE-requested PDU session establishment procedure) handling, by enabling the UE to thoroughly examine the mapped EPS bearer contexts for semantic errors. In particular, the semantic error of the resulting mapped EPS bearer context having invalid or missing parameters is thus spotted for proper handling. Advantageously, the UE operations and the network operations related to the upcoming inter-system change may be improved.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:

1. A method, executed by a User Equipment (UE) communicatively connected to a mobile communication network, the method comprising:
   receiving a first 5G Session Management (5GSM) message comprising at least one mapped Evolved Packet System (EPS) bearer context for an inter-system change from the mobile communication network;
   determining that there is a semantic error in the mapped EPS bearer context; and
   sending a second 5GSM message to the mobile communication network to delete the mapped EPS bearer context in response to the semantic error being that the mapped EPS bearer context comprises an operation code indicating "Create new EPS bearer" or "Modify existing EPS bearer" and the resulting mapped EPS bearer context has invalid or missing mandatory parameters.

2. The method of claim 1, wherein the first 5GSM message is a PDU SESSION MODIFICATION COMMAND message or a PDU SESSION ESTABLISHMENT ACCEPT message.

3. The method of claim 1, wherein the first 5GSM message is received when the UE is in an N1 mode, and the inter-system change is from the N1 mode to an S1 mode.

4. The method of claim 1, wherein the invalid or missing parameters are mandatory parameters for activation of a dedicated EPS bearer context for the inter-system change.

5. The method of claim 4, wherein the mandatory parameters comprise EPS Quality of Service (QoS) parameters and Traffic Flow Template (TFT) parameters for the dedicated EPS bearer context.

6. The method of claim 1, wherein the invalid or missing parameters are mandatory parameters for activation of a default EPS bearer context for the inter-system change.

7. The method of claim 6, wherein the mandatory parameters comprise EPS Quality of Service (QoS) parameters for the default EPS bearer context.

8. The method of claim 1, wherein each of the invalid parameters is a mandatory parameter having a reserved value, a decoding error, a length error, a syntactical error, or a semantic error, or being empty.

9. The method of claim 1, wherein the second 5GSM message is a PDU SESSION MODIFICATION REQUEST message comprising a 5GSM cause indicating invalid mapped EPS bearer identity.

10. A User Equipment (UE), comprising:
    a wireless transceiver, configured to perform wireless transmission and reception to and from a mobile communication network; and
    a controller, coupled to the wireless transceiver, and configured to receive a first 5G Session Management (5GSM) message comprising at least one mapped Evolved Packet System (EPS) bearer context for an inter-system change from the mobile communication network via the wireless transceiver, determine that there is a semantic error in the mapped EPS bearer context, and send a second 5GSM message to the mobile communication network via the wireless transceiver to delete the mapped EPS bearer context in response to the semantic error being that the mapped EPS bearer context comprises an operation code indicating "Create new EPS bearer" or "Modify existing EPS bearer" and the resulting mapped EPS bearer context has invalid or missing mandatory parameters.

11. The UE of claim 10, wherein the first 5GSM message is a PDU SESSION MODIFICATION COMMAND message or a PDU SESSION ESTABLISHMENT ACCEPT message.

12. The UE of claim 10, wherein the first 5GSM message is received when the UE is in an N1 mode, and the inter-system change is from the N1 mode to an S1 mode.

13. The UE of claim 10, wherein the invalid or missing parameters are mandatory parameters for activation of a dedicated EPS bearer context for the inter-system change.

14. The UE of claim 13, wherein the mandatory parameters comprise EPS Quality of Service (QoS) parameters and Traffic Flow Template (TFT) parameters for the dedicated EPS bearer context.

15. The UE of claim 10, wherein the invalid or missing parameters are mandatory parameters for activation of a default EPS bearer context for the inter-system change.

16. The UE of claim 15, wherein the mandatory parameters comprise EPS Quality of Service (QoS) parameters for the default EPS bearer context.

17. The UE of claim 10, wherein each of the invalid parameters is a mandatory parameter having a reserved value, a decoding error, a length error, a syntactical error, or a semantic error, or being empty.

18. The UE of claim 10, wherein the second 5GSM message is a PDU SESSION MODIFICATION REQUEST message comprising a 5GSM cause indicating invalid mapped EPS bearer identity.

* * * * *